United States Patent [19]

Tan

[11] Patent Number: 5,037,277
[45] Date of Patent: Aug. 6, 1991

[54] POPPET VALVE FOR A HIGH PRESSURE FLUID PUMP

[75] Inventor: David K. M. Tan, Sydney, Australia

[73] Assignee: Flow International Corporation, Kent, Wash.

[21] Appl. No.: 385,714

[22] Filed: Jul. 26, 1989

[51] Int. Cl.$^5$ .............................................. F16K 15/00
[52] U.S. Cl. .................................... 417/567; 137/540; 251/333
[58] Field of Search ...... 137/533.19, 540, 542–543.23, 137/1; 251/333; 417/559, 567, 568, 53

[56] References Cited

U.S. PATENT DOCUMENTS

| | | | |
|---|---|---|---|
| 1,370,254 | 3/1921 | Yearsley | 137/540 X |
| 1,620,524 | 3/1927 | Luiz | 137/540 |
| 1,665,394 | 4/1928 | Willoughby . | |
| 1,677,056 | 7/1928 | Small | 137/543.17 X |
| 1,737,706 | 12/1929 | Collins | 137/543.17 |
| 1,777,611 | 10/1930 | Grohek . | |
| 2,223,994 | 12/1940 | Johnson | 137/543.21 |
| 2,632,621 | 3/1953 | Gamble | 137/543.13 X |
| 3,245,429 | 4/1966 | Bacino et al. . | |
| 3,260,217 | 7/1966 | Thresher | 417/567 |
| 3,357,879 | 12/1967 | Bennett . | |
| 3,782,412 | 1/1974 | Darash | 137/540 X |
| 4,215,715 | 8/1980 | Raskin . | |
| 4,269,227 | 5/1981 | Araki et al. . | |
| 4,527,351 | 7/1985 | Gerakiteys . | |
| 4,596,321 | 6/1986 | Harper et al. . | |
| 4,620,562 | 11/1986 | Pacht . | |
| 4,637,430 | 1/1987 | Scheffel | 137/543.21 X |
| 4,872,481 | 10/1989 | Shaw | 137/543.13 |
| 4,878,815 | 11/1989 | Stachowiak | 417/567 |

FOREIGN PATENT DOCUMENTS

| | | | |
|---|---|---|---|
| 2102111 | 8/1972 | Fed. Rep. of Germany | 137/543.17 |
| 738589 | 10/1932 | France | 137/543.17 |

OTHER PUBLICATIONS

"Science Puzzlers" by Martin Gardner, p. 109, Bernouli's Principle.

Primary Examiner—Robert G. Nilson
Attorney, Agent, or Firm—Hughes & Multer

[57] ABSTRACT

An outlet valve for a high pressure pump which is designed to alleviate "sticking" of the moveable valve element. An annular recess is formed at a transitional flow area where high pressure fluid flows forwardly and then radially outwardly between contact surfaces of the valve element and a valve seat member. It is believed this alleviates a problem of separated flow at the transition area which would effectively decrease the flow area and cause a localized pressure reduction which would delay proper opening of the valve element. Also, other configurations are shown for tripping the boundary layer to avoid separation, and other configurations to alleviate the same.

35 Claims, 3 Drawing Sheets

POPPET VALVE FOR A HIGH PRESSURE FLUID PUMP

BACKGROUND OF THE INVENTION a. Field of the Invention

The present invention relates to a valve, and more particularly to a valve adapted for use in a high pressure pump, such as a poppet valve to receive flow from a high pressure piston.

b. Background Art

High pressure pumps are utilized in a variety of applications. In such pumps a fluid is brought to pressures as high as 10,000 psi or even as high as 100,000 psi or greater. This pressurized fluid, (generally water) can then be discharged through a nozzle as a high velocity stream of water to accomplish functions such as cutting, abrading, etc. A common arrangement of such a high pressure pump is to have a plunger or piston which reciprocates in a cylinder on an intake stroke where the plunger retracts to draw water into the cylinder chamber, and a discharge stroke where the plunger acts against the water to discharge it at a very high pressure.

An outlet valve is positioned at the end of the cylinder to receive the flow of high pressure fluid. On the pressure stroke, the outlet valve opens to receive the flow of high pressure fluid, while on the return stroke of the plunger, the outlet valve closes to prevent the pressurized fluid from returning into the cylinder with water flowing into the cylinder through an inlet valve.

A typical valve used in this application is a poppet valve, where the valve element has a transversely extending contact surface which fits against a matching contact surface of the valve member to close the passageway leading from the high pressure chamber. A spring or other means is used to urge the valve element toward its closed position. On the pressure stroke of the plunger, the pressure in the cylinder chamber moves the valve element to its open position to permit the pressurized fluid to flow around the valve element to an accumulator or manifold to be utilized in some operation, such as forming a high velocity jet.

One of the problems associated with such poppet valves is that there is sometimes a delay in the proper opening of the valve, which is commonly described as "sticking" of the valve. Desirably, when the force resulting from pressure of the fluid within the cylinder chamber reaches a level just at or above the combined force of the pressure downstream of the poppet valve and of the biasing spring, the poppet valve should open so that there is a flow of fluid from the chamber to a down stream location without any substantial discontinuity in fluid pressure. However, if there is a delay in the proper opening of the valve, there can be a pressure spike where the pressure in the cylinder continues to rise to an undesirably high level. Even without such pressure surges, the fluid is pressurized to a very high level, thus imparting substantial loads on the components of the pump assembly. Thus, pressure surges above the desired level place rather severe stresses on the components of the pumping assembly.

Some of the prior art approaches for alleviating the problem of delay in opening of such poppet valves are based on the belief that the delay is caused by sealing over too large an area. To explain this further, if the area of the poppet element that is exposed to high pressure on the downstream side is greater than the area of the poppet element that is exposed directly to fluid pressure on the upstream side, it is assumed that the forces acting on the valve element will not balance until the pressure times the effective pressure area on the downstream side (plus the force of the biasing spring) is equal to the pressure times the effective pressure area on the upstream side. Thus, one prior art approach is to minimize this effect by roughening the contact surfaces to discourage full contact of the valve element with the short term solution since the contact forces tend to make the contact surfaces more smooth. Another prior art approach is to minimize the contact area between the valve element and the valve seat. However, this can undesirably increase the local load bearing forces (both static and impact) with a consequent increase in wear.

SUMMARY OF THE INVENTION

The valve of the present invention comprises a valve seat member having a passage defining surface which defines a valve passageway having a forward outlet end portion. The valve seat member also has a valve seat contact surface which extends radially outwardly from the outlet end of the valve passageway.

There is a valve element having a contact surface, with this valve element being moveable between a closed position where the valve element contacting surface bears against the valve seat contact surface to close the valve passageway, and an open position where the valve element contact surface is spaced from the valve seat contact surface to define therebetween a radially outwardly extending passageway region to receive flow from the valve passageway. The passageway defining surface meets the valve seat contact surface at a transition region where flow from the valve passageway flows into said radially extending passageway region. The valve seat member has a recess surface portion which defines at said transition region an annular section having a radially inward rear edge portion, a radially outward forward edge portion, and an intermediate surface portion, said rear edge portion and said forward edge portion defining end limits of a transitional flow surface region, said intermediate surface portion defining an annular fluid recess spaced radially outwardly of said transition fluid flow surface region.

Thus, fluid flow from the valve passageway flows through said transition region with the transitional fluid flow surface region defining a flow boundary cf said fluid.

In one configuration, the intermediate surface portion has a rear generally transverse surface section extending radially outwardly from the passageway defining surface, and a generally longitudinally extending surface section facing radially inwardly toward said valve passageway. The transversely extending surface section forms with the passageway defining surface a relatively sharp circumferential edge which is sufficiently sharp to cause tripping of boundary layer flow adjacent to said circumferential edge.

The longitudinally extending surface portion desirably has a diameter which is between about 1.1 to 1.5 times greater than a diameter of said valve passageway immediately adjacent to said transition surface region, and more desirably between about 1.2 to 1.3 times greater. The recess surface portion desirably has a longitudinal dimension which is between about one to five times a lateral width dimension of said recess, and more desirably between about 1.5 to 3 times.

In one arrangement of the present invention, the recess surface portion is positioned radially outwardly of a frusto conical plane defined by the radially inward rear edge portion and the radially outward forward edge portion. In another arrangement, the recess surface portion is positioned adjacent to the frusto conical plane defined by said radially inward rear edge portion and said radially outward forward edge portion.

In accordance with another aspect of the present invention, the valve has boundary layer tripping means positioned at a location of flow into said transition region arranged to trip boundary layer flow of fluid flowing along said passageway defining surface. In one arrangement, the boundary layer tripping means comprises means defining a circumferential edge at the passageway defining surface having sufficient sharpness to trip the boundary layer In another arrangement, the boundary layer tripping means comprises protruding means extending radially inwardly from the passageway defining surface. In yet another arrangement, the boundary layer tripping means comprises a surface portion of the passageway defining surface which is sufficiently rough to cause tripping of the boundary layer.

In another embodiment of the present invention, the transition region where the flow from the valve passageway flows into the radially outwardly extending passageway region is arranged so that in circumferential cross sectional configuration, it is convexly curved in a continuous curve to cause boundary layer flow along said transition surface in a continuous curved path from said valve passageway to said radially outwardly extending passageway region.

In another embodiment there is an expanded passageway region radially outwardly of said forward outlet end and radially inwardly of said valve seat contact surface to alleviate restricted flow from said valve passageway.

In a method of the present invention, the flow of the fluid flowing through the valve passageway is tripped at a location rearwardly of the transition region, as described above.

Other features of the present invention will become apparent from the following detailed description.

DESCRIPTION OF THE PREFERRED EMBODIMENT

Figure 1:
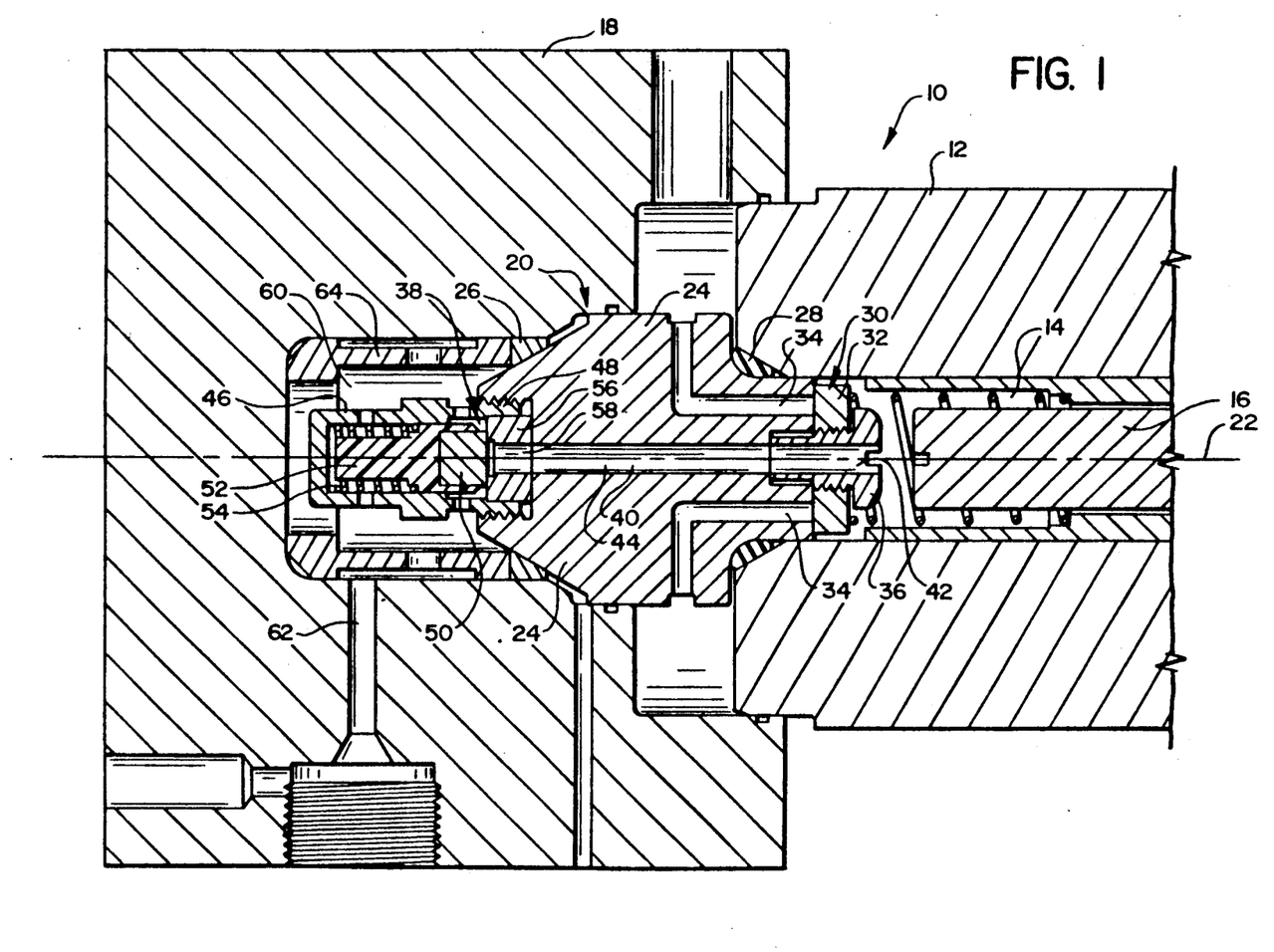
FIG. 1 is a sectional view taken along a longitudinal center line of an outlet portion of a pump incorporating the valve of the present invention.

It is believed that a clearer understanding of the present invention can be obtained by preceding the description of the present invention with a review of the structure and operation of a high pressure pump in which the present invention can desirably be incorporated. With reference to FIG. 1, this pump 10 comprises a cylinder housing 12 defining a high pressure chamber 14 in which reciprocates a high pressure plunger or piston 16 There is an end block 18 fixedly connected to the end of the cylinder housing 12, and containing a valve assembly generally designated 20. This particular valve assembly 20 is the subject matter of a co-pending application, entitled "HIGH PRESSURE PUMP VALVE ASSEMBLY" which has been filed previously in the U.S. Patent and Trademark Office on Apr. 4, 1989, Ser. No. 07/333,560.

In describing the present invention, the pump apparatus 10 will be considered as having a center longitudinal axis 22 which extends along the reciprocating path of the plunger 16. The term "forward" will denote a direction toward an outlet end of the pump apparatus 10 (which is to the left in FIG. 1, while the term "rear" or "rearward" will denote the opposite direction. The term "radially outward" shall denote a direction or location away from the longitudinal center axis 22, while the term "radially inward" will denote proximity to, or a direction toward, the longitudinal axis 22.

The valve assembly 20 comprises a valve block 24 which is positioned forwardly of, and aligned with, the plunger 16. This valve block 24 has forward and rear seals 24 and 28 which form seals between the valve block 24 and the end block 16 and the cylinder housing 12, respectively. There is an inlet check valve 30 in the form of a disc 32 which is positioned to close a plurality of inlet openings 34 which are formed in the valve block 24 and which permit water at low pressure to flow into the chamber 14 on the intake stroke of the plunger 16. This disc 32 is retained by a suitable bolt 36 which permits limited movement of the disc valve element 32 between its open and closed position. This inlet check valve element 32 is, or may be, of conventional design.

The valve of the present invention is generally designated 38, and this valve 38 functions as a check valve to receive high pressure fluid flow from a center passageway 40 leading from the chamber 14. This passageway 40 has a rear portion 42 formed in the bolt 36 and a middle passageway portion 44 formed in the valve block 24. Before describing in detail the inventive features of this valve 38, we will continue with a brief description of the main components of the pump 10 (including the main components of the valve 38) so that the overall pump configuration in which this valve 38 is incorporated can be properly understood.

There is a cylindrically shaped valve guide sleeve 46 having a rear threaded end 48 that screws into the forward end of the valve block 24. Positioned within this valve guide sleeve 46 is a cylindrically shaped valve element 50 which is fixedly mounted to the rear end of a plastic guide member 52 that is mounted for limited back and forth slide movement in the valve guide sleeve 46. A compression spring 54 urges the guide member 52 rearwardly to place the valve element 50 in its closed position.

There is a valve seat member 56 which fits within the forward end of the guide sleeve 46. This valve seat member 56 has a cylindrical configuration and has a through center opening 58 which is aligned with and has the same cross-sectional configuration as, the aforementioned passageway 40 so as to essentially form a continuation thereof.

The guide sleeve 46, guide member 52 and valve element 50 are positioned in a valve chamber 60 which is defined by the end block 18. There is an outlet passageway 62 leading from the chamber 60 to a manifold, accumulator, or other apparatus to receive the high pressure fluid from the pump 10. As indicated previously, one of the uses of the pump 10 is to supply fluid (e.g. water) to provide a high pressure water jet. Thus the pressure in the valve chamber 60 is maintained at high pressure. A spacing sleeve 64 is positioned within the periphery of the chamber 60 to position the aforementioned forward seal 26.

To describe briefly the overall operation of the pump 10, on the intake stroke, the plunger 16 moves rearwardly in the cylinder chamber 14 (i.e., to the right, as shown in FIG. 1), so that the inlet valve element 32 moves rearwardly so that fluid flows through the inlet openings 34 and into the chamber 14. At this time, the urging of the compression spring 54 and also the fluid pressure in the valve chamber 60 hold the valve element 50 in its closed position against the valve seat member 56, thus preventing backflow of the high pressure fluid in the valve chamber 60 into the cylinder chamber 14.

On the discharge stroke, the plunger 16 moves forwardly (i.e. to the left as seen in FIG. 1) to create very high pressure in the cylinder chamber 14 (e.g. 10,000 psi up to 100,000 psi or more). At such time as the force resulting from pressure in the cylinder chamber 14 exceeds by a sufficiently high amount the force resulting from the fluid pressure in the valve chamber 60 and the force of the compression spring 54 against the valve element 50, the valve element 50 moves away from the valve seat member 56 to permit flow of high pressure fluid through the outlet passageway 40 and into the valve chamber 60, from which the fluid flows outwardly through the outlet passage 62.

However, as indicated previously herein under the heading "Background Art" one of the problems in prior outlet poppet valves is that there sometimes is a delay in the valve moving to a full open position so as to cause what are sometimes very severe pressure spikes within the cylinder chamber 14.

The present invention is based upon the hypothesis or discovery that the so-called "sticking" of the poppet valve is not an accurate explanation of the phenomena involved. Rather, it is hypothesized that the delay in the valve element moving to its full open position is due to a condition of an area of low pressure between the contact surfaces of the valve seat and the valve element, where low pressure is developed during the initial opening phase as the valve element moves away from the valve seat in a manner to tend to move the valve element back toward its closed position. This will be explained further with reference to FIGS. 2 and 3.

Figure 2:
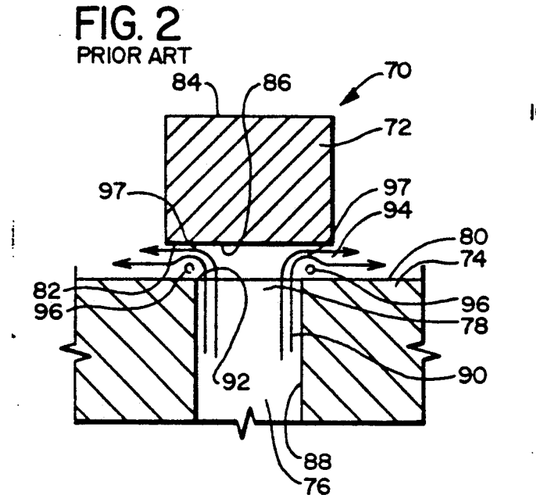
FIG. 2 is a somewhat schematic drawing of a typical prior art poppet valve used in a high pressure pump, this view being taken in section along a longitudinal center line of the valve, and illustrating a flow pattern, the recognition of which in the present invention is believed to be at least in part responsible for the solution provided by the present invention.

In FIG. 2 there is shown a typical prior art poppet valve 70 comprising a cylindrically shaped poppet element 72 and a valve seat element 74 having an upstream through passageway 76 with an outlet end portion 78. The valve seat element 74 thus defines an annular planar contact surface area 80 which extends radially outwardly from the passageway outlet portion 78 and is arranged to come into contact with a matching contact surface 82 formed in the poppet element 72. As indicated previously, one of the prior art approaches in solving the so-called "sticking" problems is predicated on the theory that the effective pressure surface area on the downstream pressure surface 84 on the back side of the poppet element 72 is greater than the effective pressure surface area 86 which is exposed directly to pressure from fluid in the upstream passageway 76 when the poppet element 72 is in its fully closed position. Thus, it is surmised that it is necessary for the pressure in the passageway 76 to rise to a sufficiently high level so that the force to open the poppet valve (computed by multiplying the cross-sectional area of the passageway 76 times the pressure in the passageway 76) is just greater than the force of the downstream pressure closing the poppet valve (this being computed by multiplying the total effective pressure area of the surface 84 times the downstream pressure) plus the force of the biasing spring. As indicated above, in accordance with the hypothesis of the present invention, this is believed to be an inadequate explanation.

With further reference to FIG. 2, in accordance with the hypothesis of the present invention, when the pressure in the upstream passageway 76 begins to exceed the pressure downstream of the poppet element 72, with the poppet element 72 fully closed, the fluid pressure from the passageway 76 radiates outwardly between the contact surfaces 80 and 82 rather rapidly so that there is sufficient pressure not only against the central surface portion 86 of the poppet element surface 82 but also against the annular contact surface 82 of the poppet element 72 to cause the poppet element 72 to lift away from the contact surface 80 of the valve seat element 74.

Then, in accordance with the hypothesis of the present invention, another phenomenon occurs. The flow which is more closely adjacent to the surface 88 defining the passageway 76 (this flow line being indicated at 90) moves around a circumferential edge or corner 92 to flow into the radially expanding passageway area 94 which is between the surface areas 80 and 82 and which extends outwardly from the outlet end 78 of the passageway 76. In doing so, this portion 90 of the fluid flow tends to separate after it passes by the edge 90 to form an annular area of separated flow indicated at 96. This annular area 96 creates a reduced pressure area which causes a substantial pressure reduction in that portion of the valve element contact surface 82 which is immediately adjacent to this annular turbulent area 96. It is surmised that this results from the separated flow areas 96 effectively forming a restricted passageway area 97 between the surface area 82 and the turbulent area 96 where velocity increases to cause a lower static pressure.

Figure 2A:
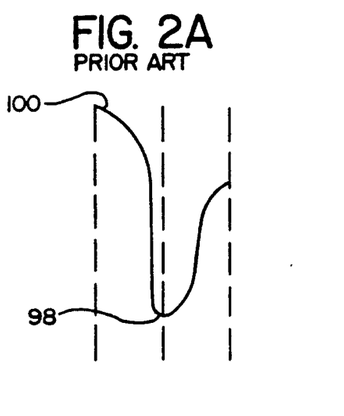
FIG. 2A is a graph illustrating pressures generated at the valve element surface during opening of the valve element.

To proceed further with an explanation of the hypothesized flow pattern and its effect, reference is now made to FIG. 2A where the base line represents the pressure at the surface areas 82 and 88.

Let it be assumed that the poppet element 72 is fully closed so that the contact surface 82 is bearing against the valve seat contact surface 80. As the associated piston begins its pressure stroke, pressure in the passageway 76 builds up, with this pressure migrating outwardly between the contact surfaces 80 and 82 so that the total pressure on the central contact area 86 and the annular contact area 82 of the poppet element 72 is sufficient to cause the poppet element 72 to initiate lifting off the valve seat 74. Coincidentally, the fluid flows at high velocity through the Passageway 76, around the circular edge 92 and into the radially expanding passageway 94 which is defined by the closely adjacent contact surfaces 80 and 82. It is at this time that the annular separated flow area 96 is formed, and at this time it will have significant dimensions relative to the small opening dimension, causing very high velocity flow adjacent to the separated flow area 96 to cause the low pressure area indicated at 98 in FIG. 2A. This low pressure area causes a pressure imbalance so that pressure against the front valve element surface 84 actually tends to move the poppet element 72 back toward its closed position, thus pausing in this position and further restricting flow outwardly through the radially expanding passageway 94 and causing a pressure spike within the passageway 76. This pressure spike is the passageway 76 continues to build up to a level indicated at 100 until the force against the upstream side of the poppet element 72 at the surface area 86 is sufficient to move the poppet element 72 further from the valve seat 74 and permit adequate flow to alleviate the pressure spike which will drop from the level shown at 100.

It is to be understood that with the very high fluid pressures, the fluid compressibility and the high fluid velocities involved, it is very difficult to get direct measurement and observation within the flow area of the valve. The hypothesis described above was derived by examining data relating to fluid flow and pressures during the operation of the valve 72 of FIG. 2 moving toward its open position. A computer model was made to simulate these pressures and presumed flow conditions and from this the hypothesis of the present invention was derived. However, it is to be understood that regardless of the accuracy of the above described hypothesis in accounting for the improved performance of the present invention, it has been found that by incorporating the teachings of the present invention, the so-called "sticking" phenomenon of the valve has been alleviated to a substantial extent.

Figure 3:
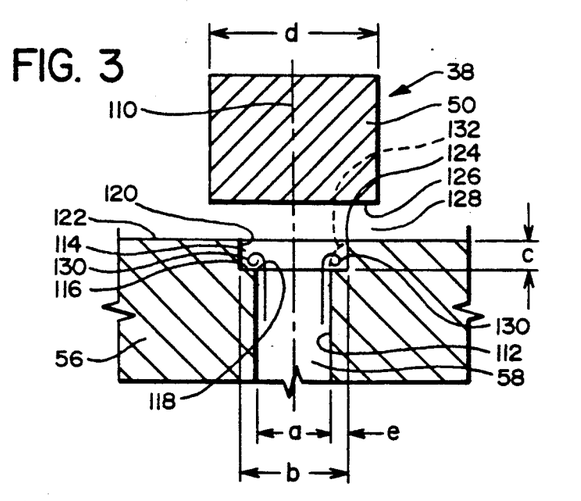
FIG. 3 is a sectional view taken along the longitudinal axis of the valve of the present invention, drawn to an enlarged scale and illustrating certain aspects of the flow patterns through this valve.

With the foregoing in mind, reference is made to FIG. 3 which illustrates the valve of the present invention, drawn to an enlarged scale relative to FIG. 1. There is shown in FIG. 3 the valve 38 comprising the aforementioned valve element 50, which has a cylindrical configuration, and the valve seat member 56 defining the passageway portion 58. The center axis of the valve 38 is indicated at 110. The downstream end portion of the cylindrical surface 112 that defines the passageway portion 58 is formed with an annular recess 114 which in peripheral cross-sectional configuration has a right angle annular profile, which can be considered as a right angle cutout. More specifically, there is radially outwardly extending forwardly facing annular surface 116 which forms with the cylindrical surface 112 a circumferential edge or corner 118. Also, there is a radially inwardly facing cylindrical surface 120 which is stepped radially outwardly from the passageway defining surface 112. This cylindrical surface 120 forms with a radially outwardly positioned contact surface 122 of the valve seat member 56 a second circumferential edge or corner portion 124. The valve element 50 has a cylindrical configuration.

To describe the hypothesized mode of operation of the valve 38 of the present invention, let it be assumed that the valve element 50 is in its closed position so that its annular contact surface 126 bears against the contact surface 122 of the valve seat member 56. As the valve element 50 moves just a short distance forwardly from its closed position, a radially expanding annular passageway 128 is formed between the contact surfaces 122 and 126. As fluid begins to flow forwardly through the passageway 58, the fluid closely adjacent to the passageway defining surface 112 passes closely adjacent to the circumferential edge or corner 118 formed by the surface portion 116 and the surface 112.

It is believed that this circumferential edge 118 trips the fluid flow immediately adjacent to the edge 118 so that there is a separated flow area 130 within the annular recess 114. It is surmised that there may be a rotational pattern of flow about a circumferential axis of the recess 114. It is further surmised that this annular separated flow area 130 has the effect of defining an area of relatively static fluid pressure that in effect provides a boundary surface area indicated schematically by a broken line indicated at 132 on the right side of FIG. 3. It is further surmised that this effective boundary area 132 has in peripheral cross-sectional configuration a convexly curved configuration which provides for a smooth transition of the fluid flow from the passageway 56 around the curved surface area 132 and thence through the annular radially expanding passageway area 128. It is believed that this gradual guidance of the flow helps to alleviate the formation of the separated flow area 96 described above with reference to FIG. 2.

In addition to the proposed phenomenon described immediately above, it is believed that another flow phenomenon is taking place. It is known that when there is fluid flow through a passageway, there is the boundary layer effect, where the fluid immediately adjacent to the passageway surface is slower, and the rate of fluid flow increases in the boundary layer region in a direction toward the center of the passageway. Thus, there is a velocity gradient beginning close to zero immediately adjacent to the passageway surface and increasing radially inwardly. There is a tendency for this boundary layer to become thicker in a downstream direction so that there is an increasing amount of lower energy boundary layer fluid.

With further reference to FIG. 3, it can be hypothesized that as the fluid flow closely adjacent to the surface 112 passes the edge 118, this has the effect of "tripping" the boundary layer so that the higher energy fluid in the main part of the passageway rotates inwardly more closely to the boundary layer, and the lower energy boundary layer fluid moves into the mainstream of the fluid flow. This has the effect of energizing the boundary layer so that it is less likely to separate. Thus, when the fluid flow reaches the location of the edge 124, this higher energy fluid which moves closely adjacent to the edge 124 is less likely to separate, thus alleviating the tendency to form the separated region 96 described with reference to FIG. 2.

To describe another facet of the preferred embodiment of the present invention shown in FIG. 3, it is to be recognized that with the very high pressure in the downstream valve chamber 60, on the intake stroke of the piston 16, there can be very high impact and static pressure exerted by the valve element 50 coming into contact with the valve seat member 56. This can be analogized to a "hammering" action, and it can result in deformation of the valve seat member 56 in the area of the corner 124. This can have the effect of eventually moving some of the material at the location of the corner 124 radially inwardly which could cause a further disturbance of the flow in that area. It has been found that with the embodiment of FIG. 3, even though this deformation can occur, the presumed problem of the undesired flow separation at the area 96 (see FIG. 2) is still alleviated.

In a typical preferred arrangement of the embodiment of FIG. 3, the diameter of the passageway 58 (indicated at "a" in FIG. 3) is 0.22 inch, and the diameter of the cylindrical surface 120 (indicated at "b" in FIG. 3) is 0.27 inch. The lengthwise dimension "c" of the surface 120 is about 0.05 inch. The diameter of the valve element 50 (indicated at "d") is about 0.42 inch. The total movement of the valve element 50 from its closed position to its open position would be between about 0.03 to 0.07 inch.

It is believed that the diameter of the recess (indicated at "b" in FIG. 3) would be between about 1.1 to 1.5 times the diameter of the passageway 58 (indicated at "a"), desirably between about 1.2 to 1.3 times, and more desirably between 1.2 to 1.25 times. The longitudinal dimension of the recess defining surface section 132 (indicated at "c" in FIG. 3) is desirably between about 1 to 5 times the lateral thickness dimension of the recess 14 (indicated at "e" in FIG. 3), and more preferably between about 1.5 to 3 times. The longitudinal dimension of the recessed defining surface section 132 (indicated at "c") FIG. 3 is desirably between about 0.15 to 0.3 times the diameter of the passageway 58 (indicated at "a"), and more preferably between about 0.2 to 0.25 times.

Figure 4:
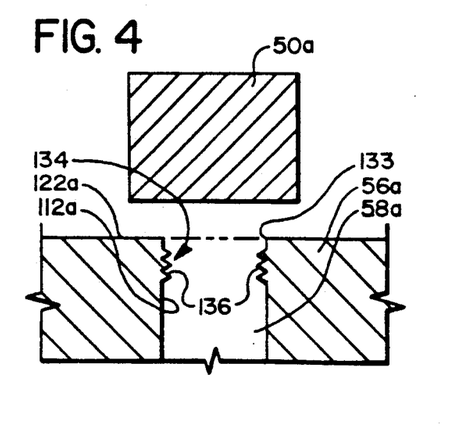
FIG. 4 is a sectional view similar to FIG. 3, showing a second embodiment of the present invention.

It is has been found that the preferred embodiment of the -resent invention illustrated in FIG. 3 is a significant advance in alleviating the valve delay opening problem. To speculate on possibly broader aspects of the present invention, on the assumption that the hypothesis on which the present invention is based has at least some measure of validity, alternative embodiments could also be feasible. Reference is made to FIG. 4 where there is shown a valve element 50a and valve seat member 56a forming a passageway 58a. The passageway defining surface 112a meets a contact surface 122a at a circumferential corner area 133. At a location upstream of the edge or corner 133, there is provided on the surface 112a a fluid flow tripping area 134 which in FIG. 4 is shown as a plurality of inwardly protruding annular ridge members 136 which extend circumferentially around the surface 112a. These projections 136 have the effect of tripping the boundary layer of the fluid flow through the passageway 58a to cause the low energy boundary layer fluid to mix into the mainstream of the fluid flow, with this low energy fluid being replaced by higher energy fluid from the main passageway portion. It is believed that when the fluid flow reaches the location of the corner 133, this configuration better enables the flow to move around the corner 133 in a manner to alleviate at least partially the separated flow region 96, as shown in FIG. 2.

Figure 5:
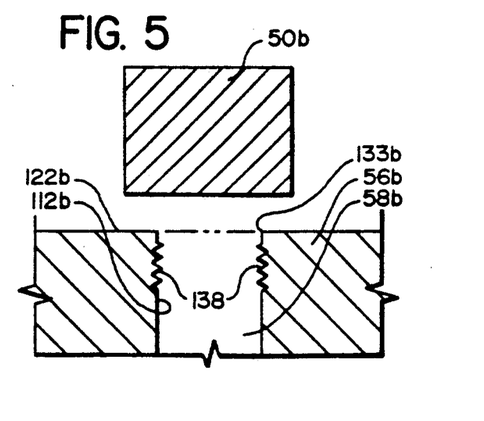
FIG. 5 is a view similar to FIG. 4, showing a third embodiment of the present invention.

A third embodiment of the present invention is shown in FIG. 5. This is quite similar to the first embodiment, except that instead of having the annular ridge members 136, there is provided a roughened surface portion which is indicated at 138. Thus, in this third embodiment, there is the valve element 50b, the surface 112b forming the passageway 58b, the contact surface 122b, and the circumferential corner 133b. The roughened area 138 is formed upstream of the location of the corner 133b.

Figure 6:
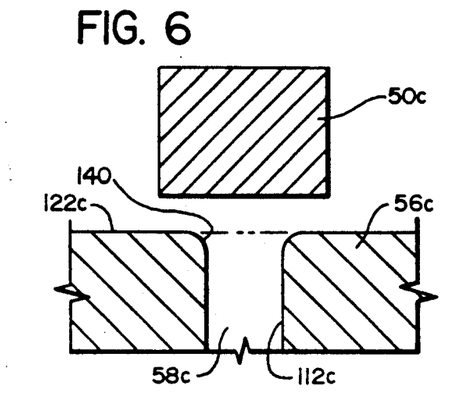
FIG. 6 is a sectional view similar to FIGS. 3 and 4 showing yet a fourth embodiment of the present invention.

Another possible solution is shown in FIG. 6, where there is shown a valve element 50c and a valve seat member 56c defining a passageway 58c. At the downstream end of the passageway 58c, the passageway defining surface 112c has in peripheral cross-sectional configuration a convexly curved surface portion 140 which blends in a continuous ninety degree curve into the contact area 122c. By eliminating the sharp corner (indicated at 92 in FIG. 2), there is less tendency for the flow to separate and form the separated flow area 96 of FIG. 2. While the configuration shown in FIG. 5 may have value for certain applications, one disadvantage is that repeated impacts of the valve element 50c against the contact surface 122c may have the tendency of disturbing the smooth surface contour 140, and thus form a protruding edge member that would undesirably trip the boundary area at a location which would have the tendency of creating a separated flow area such as that indicated at 96 in FIG. 2.

Also, within the broader aspects of the present invention, it is to be recognized that a combination of features of the several embodiments of the present invention may be effective for certain situations. For example, the preferred configuration of FIG. 3 might be utilized in combination with the arrangement shown in FIGS. 4, 5 or 6 or with combinations of these.

Figure 7:
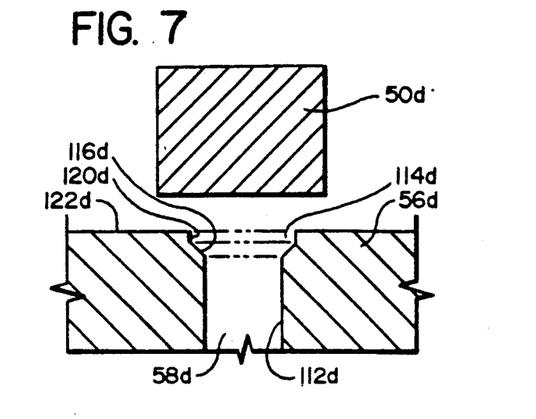
FIGS. 7 through 9 are cross sectional views similar to FIG. 3 showing modified versions of the recessed area of the valve seat element of the present invention.

FIGS. 7 through 10 show other possible arrangements of the embodiment of the invention shown in FIG. 3, with these showing variations in the configuration of the recess 114. In FIG. 7, the cylindrical surface 120d is longitudinally aligned, while the angular surface 116d slants in the configuration of a frusto conical surface.

Figure 8:
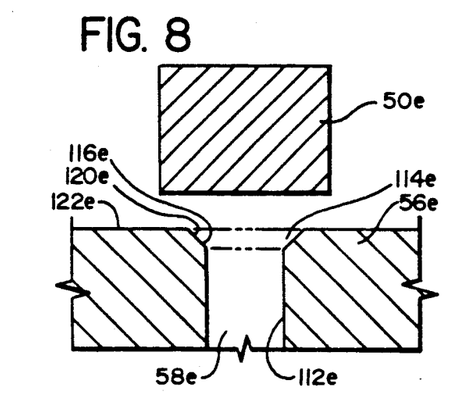

In FIG. 8, the two recess defining surface portions 116e and 120e are at the same slant so that these in effect form a single frusto conical surface to define the recess 114e which in effect is in circumferential cross section triangularly shaped.

Figure 9:
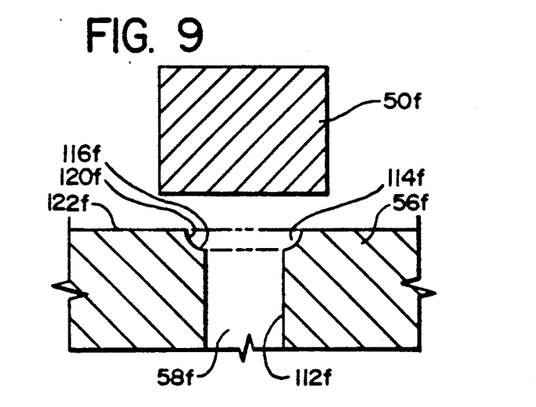

In FIG. 9, the recess 114f is formed with the surface portion 116f meeting the surface portion 120f in a continuous curve.

Also, it is to be understood that the contact surfaces 122 and 126 could have configurations other than planar configurations. For example, these could possibly be slanted so as to extend radially outwardly in a frusto conical configuration. Or these could be made as matching convex and concave surfaces.

Figure 10:
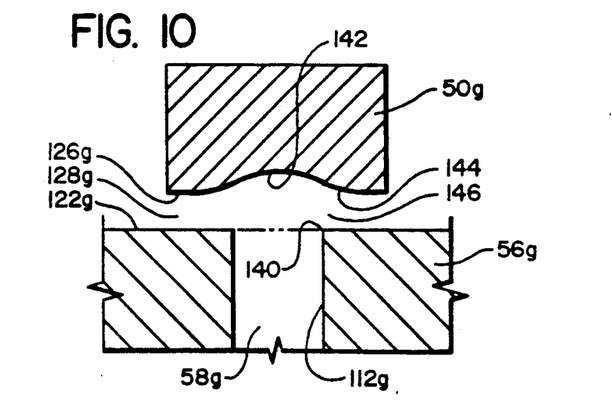
FIG. 10 is a sectional view similar to FIG. 3, showing yet a further embodiment of the present invention.

A further embodiment of the present invention is shown in FIG. 10, where there is a valve element 50g and a valve seat member 56g. The cylindrical surface 112g meets the contact surface 122g at a circumferential right angle corner 140. The valve element 50g has its rearwardly facing surface formed with a recessed area 142 which is in a spherical concave curve and extends radially outwardly beyond the circumferential edge 140, and then in circumferential cross section curves convexly as at 144 to an outer contact surface 126g. Thus, the fluid flow which passes by the circumferential edge 140 has a flow area 146 of a greater cross sectional area than the more radially outward passageway portion 128g. Thus, even though separated flow occurs may immediately adjacent to the edge 140, the flow area 146 is sufficiently large so that the reduced pressure area due to constricted flow around the area of separation is largely alleviated.

It is to be recognized that various modifications can be made to the present invention without departing from the basic teachings thereof.

What is claimed is:

1. A very high pressure liquid pump arranged to alleviate delayed outlet valve opening in a manner to prevent pressure spikes at initiation of an outflow portion of a pumping cycle, said pump comprising:
   a. a structure defining a liquid chamber to receive liquid which is to be pumped;
   b. piston means arranged to pump liquid from said chamber at a very high pressure;
   c. an outlet valve comprising:
      i. a valve seat member having:
         1. a passageway defining surface which defines a valve passageway having a forward outlet end portion;
         2. a valve seat contact surface which extends radially outwardly from the outlet end portion of the valve passageway;
      ii. a valve element having a valve element contact surface, said valve element being movable between a closed position where said valve element contact surface bears against said valve seat contact surface to close said valve passageway and an open position where said valve element contact surface is spaced from said valve seat contact surface to define therebetween a radially outwardly extending passageway region to receive flow from said valve passageway;
      iii. said passageway defining surface meeting said valve seat contact surface at a transition region where flow from said valve passageway flows into said radially outwardly extending passageway region, said valve seat member having a recess surface portion which defines at said transition region an annular recess having a radially inward rear edge portion, a radially outward forward edge portion, and an intermediate surface portion, said rear edge portion and said forward edge portion defining end limits of a transitional fluid flow surface region, said intermediate surface portion defining an annular fluid recess spaced radially outwardly of said transitional fluid flow surface region, whereby as said piston means begins a discharge stroke, so as to move said valve element away from said valve seat member potential pressure reduction adjacent to said transition region is substantially alleviated to permit said valve element to move to a fully open position without creating any substantial pressure spike in said chamber.

2. The pump as recited in claim 1, wherein said intermediate surface portion has rear generally transverse surface section extending radially outward from said passageway defining surface, and a generally longitudinally extending surface section forcing radially inwardly toward said valve passageway.

3. The pump as recited in claim 2, wherein said transverse surface section forms with said passageway defining surface a relatively sharp circumferential edge which is sufficiently sharp to cause tripping of boundary layer flow adjacent to said circumferential edge.

4. The pump as recited in claim 3, wherein said passageway defining surface has a diameter at a location rearwardly of said recess surface portions which is between about 1.1 to 1.5 times greater than a diameter of said valve passageway immediately adjacent to said transition surface region.

5. The pump as recited in claim 4, wherein said recess surface portion has a longitudinal dimension which is between about 1 to 5 times a lateral width dimension of said recess.

6. The pump as recited in claim 3, wherein said passageway defining surface portion has a diameter at said location rearwardly of said recess surface portion which is between about 1.2 to 1.3 times greater than a diameter of said valve passageway immediately adjacent to said transition surface region.

7. The pump as recited in claim 6, wherein said recess surface portion has a longitudinal dimension which is between about 1.5 to 3 times the lateral width dimension of said recess.

8. The pump as recited in claim 2, wherein said passageway defining surface has a diameter at said location rearwardly of said recess surface portion which is between about 1.1 to 1.5 times greater than a diameter of said valve passageway immediately adjacent to said transition surface region.

9. The pump as recited in claim 8, wherein said recess surface portion has a longitudinal dimension which is between about 1 to 5 times a lateral width dimension of said recess.

10. The pump as recited in claim 2, wherein said recess surface portion has a longitudinal dimension which is between about 1 to 5 times a lateral width dimension of said recess.

11. The pump as recited in claim 2, wherein said longitudinally extending surface portion has a diameter which is between about 1.2 to 1.3 times greater than a diameter of said valve passageway immediately adjacent to said transition surface region.

12. The pump as recited in claim 11, wherein said recess surface portion has a longitudinal dimension which is between about 1 to 5 times a lateral-width dimension of said recess.

13. The pump as recited in claim 2, wherein said recess surface portion has a longitudinal dimension which is between about 1.5 to 3 times a lateral width dimension of said recess.

14. The pump as recited in claim 1, wherein said recess surface portion is positioned radially outwardly of a frusto conical plane defined by said radially inward rear edge portion and said radially outward forward edge portion.

15. The pump as recited in claim 1, wherein said recess surface portion is positioned adjacent to a frusto conical plane defined by said radially inward rear edge portion and said radially outward forward edge portion.

16. A very high pressure liquid pump arranged to alleviate delayed outlet valve opening in a manner to prevent pressure spikes at initiation of an outflow portion of a pumping cycle, said pump comprising:
   a. a structure defining a liquid chamber to receive liquid which is to be pumped;
   b. piston means arranged to pump liquid from said chamber at a very high pressure;
   c. an outlet valve comprising:
      i. a valve seat member having:
         1. a passageway defining surface which defines a valve passageway having a forward outlet end portion;

2. a valve seat contact surface which extends radially outwardly from the outlet end portion of the valve passageway;

ii. a valve element having a valve element contact surface, said valve element being movable between a closed position where said valve element contact surface bears against said valve seat contact surface to close said valve passageway and an open position where said valve element contact surface is spaced from said valve seat contact surface to define therebetween a radially outwardly extending passageway region to receive flow from said valve passageway;

iii. said passageway defining surface meeting said valve seat contact surface at a transition region where flow from said valve passageway flows into said radially outwardly extending passageway region, said valve having boundary layer tripping means positioned at a location of flow into said transition region and arranged to trip boundary layer flow of fluid flowing along said passageway defining surface;

whereby as said piston means begins a discharge stroke, so as to move said valve element away from said valve seat member potential pressure reduction adjacent to said transition region is substantially alleviated to permit said valve element to move to a fully open position without creating any substantial pressure spike in said chamber.

17. The pump as recited in claim 16, wherein said boundary layer tripping means comprises means defining a circumferential edge at said passageway defining surface having sufficient sharpness to trip the boundary layer.

18. The pump as recited in claim 16, wherein said boundary layer tripping means comprises protruding means extending radially inwardly from said passageway defining surface to trip boundary layer flow.

19. The pump as recited in claim 16, wherein said boundary layer tripping means comprises a surface portion of said passageway defining surface which is sufficiently rough to cause tripping of said boundary layer.

20. A very high pressure liquid pump arranged to alleviate delayed outlet valve opening in a manner to prevent pressure spikes at initiation of an outflow portion of a pumping cycle, said pump comprising:
   a. a structure defining a liquid chamber to receive liquid which is to be pumped;
   b. piston means arranged to pump liquid from said chamber at a very high pressure;
   c. an outlet valve comprising:
      i. a valve seat member having:
         1. a passageway defining surface which defines a valve passageway having a forward outlet end portion;
         2. a valve seat contact surface which extends radially outwardly from the outlet end portion of the valve passageway;
      ii. a valve element having a valve element contact surface, said valve element being movable between a closed position where said element contact surface bears against said valve seat contact surface to close said valve passageway and an open position where said valve element contact surface is spaced from said valve seat contact surface to define therebetween a radially outwardly extending passageway region to receive flow from said valve passageway;
      iii. said passageway defining surface meeting said valve seat contact surface at a transition region where flow from said valve passageway flows into said radially outwardly extending passageway region, said valve seat member having a transition surface portion at said transition region which in circumferential cross-sectional configuration is convexly curved in a continuous curve to cause boundary layer flow along said transition surface in a continuous curved path from said valve passageway to said radially outwardly extending passageway region;

whereby as said piston means begins a discharge stroke, so as to move said valve element away from said valve seat member potential pressure reduction adjacent to said transition region is substantially alleviated to permit said valve element to move to a fully open position without creating any substantial pressure spike in said chamber.

21. A very high pressure liquid pump arranged to alleviate delayed outlet valve opening in a manner to prevent pressure spikes at initiation of an outflow portion of a pumping cycle, said pump comprising:
   a. a structure defining a liquid chamber to receive liquid which is to be pumped;
   b. piston means arranged to pump liquid from said chamber at a very high pressure;
   c. an outlet valve comprising:
      i. a valve seat member having:
         1. a passageway defining surface which defines a valve passageway having a forward outlet end portion;
         2. a valve seat contact surface which extends radially outwardly from the outlet end portion of the valve passageway;
      ii. a valve element having a valve element contact surface, said valve element being movable between a closed position where said valve element contact surface bears against said valve seat contact surface to close said valve passageway and an open position where said valve element contact surface is spaced from said valve seat contact surface to define therebetween a radially outwardly extending passageway region to receive flow from said valve passageway;
      iii. said passageway defining surface meeting said valve seat contact surface at a transition region where flow from said valve passageway flows into said radially outwardly extending passageway region, said valve seat member and said valve element defining at said transition region an annular expanded passageway region radially outwardly of said forward outlet end portion and radially inwardly of said valve seat contact surface and of said valve element contact surface, whereby as said piston means begins a discharge stroke, so as to move said valve element away from said valve seat member potential pressure reduction adjacent to said transition region is substantially alleviated to permit said valve element to move to a fully open position without creating any substantial pressure spike in said chamber.

22. A very high pressure liquid pump arranged to alleviate delayed outlet valve opening in a manner to prevent pressure spikes at initiation of an outflow portion of a pumping cycle, said pump comprising:
   a. a structure defining a liquid chamber to receive liquid which is to be pumped;

b. piston means arranged to pump liquid from said chamber at a very high pressure;

an improvement comprising an outlet valve comprising:
  a. a valve seat member having:
    i. a passageway defining surface which defines a valve passageway having a forward outlet end portion;
    ii. a valve seat contact surface which extends radially outwardly from the outlet end portion of the valve passageway;
  b. a valve element having a valve element contact surface, said valve element being movable between a closed position where said valve element contact surface bears against said valve seat contact surface to close said valve passageway and an open position where said valve element contact surface is spaced from said valve seat contact surface to define therebetween a radially outwardly extending passageway region to receive flow from said valve passageway;
  c. said passageway defining surface meeting said valve seat contact surface at a transition region where flow from said valve passageway flows into said radially outwardly extending passageway region, said valve seat member having a recess surface portion which defines at said transition region an annular recess having a radially inward rear edge portion, a radially outward forward edge portion, and an intermediate surface portion, said rear edge portion and said forward edge portion defining end limits of a transitional fluid flow surface region, said intermediate surface portion defining an annular fluid recess spaced radially outwardly of said transitional fluid flow surface region, whereby as said piston means begins a discharge stroke, so as to move said valve element away from said valve seat member potential pressure reduction adjacent to said transition region is substantially alleviated to permit said valve element to move to a fully open position without creating any substantial pressure spike in said chamber.

23. The improvement as recited in claim 22, wherein said intermediate surface portion has a rear generally transverse surface section extending radially outward from said passageway defining surface, and a generally longitudinally extending surface section facing radially inwardly toward said valve passageway.

24. The improvement as recited in claim 23, wherein said transverse surface section forms with said passageway defining surface a relatively sharp circumferential edge which is sufficiently sharp circumferential edge which is sufficiently sharp to cause tripping of boundary layer flow adjacent to said circumferential edge.

25. The improvement as recited in claim 24, wherein said passageway defining surface has a diameter at a location rearwardly of said recess surface portion which is between about 1.1 to 1.5 times greater than a diameter of said valve passageway immediately adjacent to said transition surface region.

26. The valve as recited in claim 25, wherein said recess surface portion has a longitudinal dimension which is between about 1 to 5 times a lateral width dimension of said recess.

27. The improvement as recited in claim 23, wherein said passageway defining surface has a diameter at said location rearwardly of said recess surface portion which is between about 1.1 to 1.5 times greater than a diameter of said valve passageway immediately adjacent to said transition surface region.

28. The improvement as recited in claim 23, wherein said recess surface portion has a longitudinal dimension which is between about 1 to 5 times a lateral width dimension of said recess.

29. The improvement as recited in claim 22, wherein said recess surface portion is positioned radially outwardly of a frusto conical plane defined by said radially inward rear edge portion and said radially outward forward edge portion.

30. The improvement as recited in claim 22, wherein said recess surface portion is positioned adjacent to a frusto conical plane defined by said radially inward rear edge portion and said radially outward forward edge portion.

31. In a very high pressure liquid pump arranged to alleviate delayed outlet valve opening in a manner to prevent pressure spikes at initiation of an outflow portion of a pumping cycle, said pump comprising:
  a. a structure defining a liquid chamber to receive liquid which is to be pumped;
  b. piston means arranged to pump liquid from said chamber at a very high pressure;

an improvement comprising an outlet valve comprising:
  a. a valve seat member having:
    i. a passageway defining surface which defines a valve passageway having a forward outlet end portion;
    ii. a valve seat contact surface which extends radially outwardly from the outlet end portion of the valve passageway;
  b. a valve element having a valve element contact surface, said valve element being movable between a closed position where said element contact surface bears against said valve seat contact surface to close said valve passageway and an open position where said valve element contact surface is spaced from said valve seat contact surface to define therebetween a radially outwardly extending passageway region to receive flow from said valve passageway;
  c. said passageway defining surface meeting said valve seat contact surface at a transition region where flow from said valve passageway flows into said radially outwardly extending passageway region, said valve having boundary layer tripping means positioned at a location of flow into said transition region and arranged to trip boundary layer flow of fluid flowing along said passageway defining surface;

whereby as said piston means begins a discharge stroke, so as to move said valve element away from said valve seat member potential pressure reduction adjacent to said transition region is substantially alleviated to permit said valve element to move to a fully open position without creating any substantial pressure spike in said chamber.

32. The improvement as recited in claim 31, wherein said boundary layer tripping means comprises means defining a circumferential edge at said passageway defining surface having sufficient sharpness to trip the boundary layer.

33. The improvement as recited in claim 31, wherein said boundary layer tripping means comprises protruding means extending radially inwardly from said passageway defining surface to trip boundary layer flow.

34. The improvement as recited in claim 31, wherein said boundary layer tripping means comprises a surface portion of said passageway defining surface which is sufficiently rough to cause tripping of said boundary layer.

35. In a very high pressure liquid pump arranged to alleviate delayed outlet valve opening in a manner to prevent pressure spikes at initiation of an outflow portion of a pumping cycle, said pump comprising:
  a. a structure defining a liquid chamber to receive liquid which is to be pumped;
  b. piston means arranged to pump liquid from said chamber at a very high pressure;
an improvement comprising an outlet valve comprising:
  a. a valve seat member having:
    i. a passageway defining surface which defines a valve passageway having a forward outlet end portion;
    ii. a valve seat contact surface which extends radially outwardly from the outlet end portion of the valve passageway;
  b. a valve element having a valve element contact surface, said valve element being movable between a closed position where said element contact surface bears against said valve seat contact surface to close said valve passageway and an open position where said valve element contact surface is spaced from said valve seat contact surface to define therebetween a radially outwardly extending passageway region to receive flow from said valve passageway;
  c. said passageway defining surface meeting said valve seat contact surface at a transition region where flow from said valve passageway flows into said radially outwardly extending passageway region, said valve seat member having a transition surface portion at said transition region which in circumferential cross-sectional configuration is convexly curved in a continuous curve to cause boundary layer flow along said transition surface in a continuous curved path from said valve passageway to said radially outwardly extending passageway region;
whereby as said piston means begins a discharge stroke, so as to move said valve element away from said valve seat member potential pressure reduction adjacent to said transition region is substantially alleviated to permit said valve element to move to a fully open position without creating any substantial pressure spike in said chamber.

* * * * *